United States Patent Office 3,555,034
Patented Jan. 12, 1971

3,555,034
CERTAIN 5,6,7,8-TETRAHYDRO-1,6-NAPHTHYRIDIN-2-OL ESTERS
James L. Diebold, Havertown, and Milton Wolf, West Chester, Pa., assignors to American Home Products Corporation, New York, N.Y., a corporation of Delaware
No Drawing. Filed June 18, 1968, Ser. No. 737,834
Int. Cl. C07d 31/34
U.S. Cl. 260—295          10 Claims

ABSTRACT OF THE DISCLOSURE

This invention concerns 5,6,7,8-tetrahydro-1,6-naphthyridin-2-ol esters which are pharmacologically active as central nervous system depressants.

---

The present invention relates to new and novel naphthyridinol esters. In particular, it concerns 5,6,7,8-tetrahydro-1,6-naphthyridin-2-ol esters which in standard and accepted pharmacological tests have demonstrated central nervous system depressant activity, which is particularly useful in producing a calming effect.

The new and novel compounds within the scope of the present invention are represented by the following structural formula:

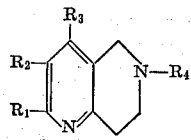

wherein $R_1$ is selected from the group consisting of lower alkanoyloxy, benzoyloxy, halobenzoyloxy, lower alkylbenzoyloxy, lower alkoxybenzoyloxy, tri(lower)alkoxybenzoyloxy and lower alkylcarbamyloxy; $R_2$ and $R_3$ are both selected from group consisting of hydrogen, lower alkyl, lower alkoxy, phenyl, halophenyl, lower alkylphenyl, trifluoromethylphenyl, lower alkoxyphenyl, phen(lower)alkyl, halophen(lower)alkyl, lower alkylphen(lower)alkyl, lower alkoxyphen(lower)alkyl, benzoyl, pyridyl, furyl, pyridazyl, pyrimidyl and thienyl, with the proviso that only one of $R_2$ and $R_3$ can be hydrogen; $R_4$ is selected from the group consisting of hydrogen, lower alkyl, phen(alkyl), phenyl, halophenyl, lower alkylphenyl, lower alkoxyphenyl, benzoyl, 2-pyridyl, di(lower)alkylamino(lower)alkyl, di(lower)alkylamino(lower)alkanoyl, carb(lower)alkoxy, lower alkylcarbamyl, and lower alkylsulfonyl; and the pharmacologically acceptable acid addition salts thereof. As employed herein the terms "lower alkyl," "lower alkoxy," "lower alkanoyl" and the like are meant to include both branched and straight chain moieties containing from about one to about eight carbon atoms. Typical examples of these compounds are: 5,6,7,8-tetrahydro - 6 - methyl-4-phenyl-1,6-naphthyridin-2-ol,[3,4,5-trimethoxybenzoate]; 5,6,7,8 - tetrahydro - 6-methyl-4-phenyl - 1,6 - naphthyridin - 2 - ol, benzoate; 6-ethyl-5,6,7,8 - tetrahydro - 4 - (p-tolyl)-1,6-naphthyridin-2-ol, acetate; 5,6,7,8 - tetrahydro - 4,6-dimethyl-1,6-naphthyridin-2-ol,[4 - methoxybenzoate]; 6 - benzyl - 4 - (p-chlorophenyl) - 5,6,7,8 - tetrahydro - 1,6-naphthyridin-2-ol,[3,4,5 - triethoxybenzoate]; 4 - (m-bromophenyl)-5,6,7,8-tetrahydro - 6 - phenyl - 1,6 - naphthyridin-2-ol, propionate; 5,6,7,8 - tetrahydro - 3,4,6 - tripropyl - 1,6-naphthyridin-2-ol[4-bromobenzoate]; 4 benzyl - 3-(p-trifluoromethylphenyl) - 5,6,7,8 - tetrahydro-1,6-naphthyridin-2-ol,[4-toluate]; and 5,6,7,8 - tetrahydro - 6 - (2-dimethylaminoethyl) - 4 - methyl - 3 - phenyl-1,6-naphthyridin-2-ol, benzoate.

The new and novel compounds of the present invention may be prepared by the process which is illustrated by the following reaction scheme:

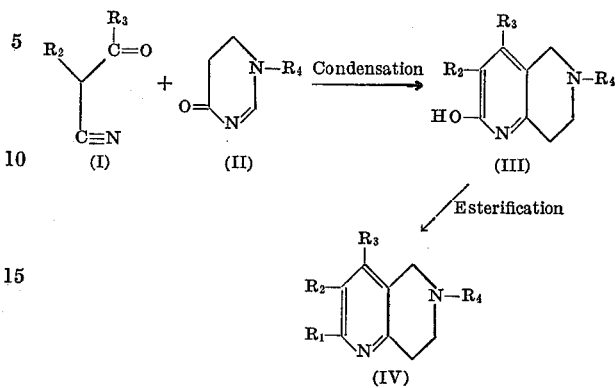

wherein $R_1$, $R_2$, $R_3$ and $R_4$ are defined as above. The condensation reaction is effected by first contacting approximately equimolar amounts of an acetonitrile (I) with an appropriate piperidone (II) in polyphosphoric acid at about steam bath temperatures for a period of about one-half to about one hour. Thereafter, an addition equimolar amount of the piperidone (II) is added to the reaction mixture and the temperature is increased to about 150° C. for a period of about one to about two hours.

When the above condensation reaction is complete, the resulting 5,6,7,8-tetrahydro-1,6-naphthyridin-2-ol (III) is recovered by standard procedures. For example, the reaction mixture is diluted with water, treated with charcoal, filtered, the filtrate basified and the resulting separated product (III) recrystallized from a suitable solvent, such as, an alkanol.

The above prepared 5,6,7,8-tetrahydro-1,6-naphthyridin-2-ol (III) is then esterified to afford the compounds of the present invention. This esterification reaction is conducted by contacting a 5,6,7,8-tetrahydro-1,6-naphthyridin-2-ol (III) with an appropriate acyl halide in a reaction-inert, aprotic organic solvent, e.g. benzene, dioxane, toluene and dimethylformamide in the presence of an acid acceptor, e.g. pyridine, quinoline and triethylamine at a temperature range from about 50° C. to about reflux temperatures for a period of about four to about twenty hours. Preferably this reaction is conducted in anhydrous benzene, in the presence of pyridine, at reflux temperatures for about six hours.

When the above esterification reaction is complete, the resulting 5,6,7,8-tetrahydro-1,6-naphthyridin-2-ol, ester (IV) is separated by conventional recovery procedures. For example, the reaction mixture is evaporated to dryness, the residue dissolved in a water-immiscible organic solvent, e.g. methylene chloride, ether or hexane which is extracted with an alkali metal carbonate solution, dried, evaporated and the resulting residue is then recrystallized from an appropriate solvent, e.g. methylcyclohexane, cyclohexane etc. to afford the product (IV).

The reactants employed in the process of this invention are known compounds which are commercially available or easily prepared by procedures well known in the chemical art. Since many of the compounds of the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmacologically acceptable acids should be employed in biological applications. Particularly effective salts are those formed with pharmacologically acceptable acids having a pK value of 3 or lower. Such acids are well known in the art, for example, hydrochloric, hydrobromic, sulfuric, nitric, phosphoric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The new and novel 5,6,7,8-tetrahydro-1,6-naphthyridin-2-ol esters (IV) of the present invention possess valuable pharmacological activity. In particular, these compounds in standard pharmacological procedures demonstrate nervous system activity and are useful as depressants. Because of this property they are of importance in producing a calming effect in warm-blooded animals.

In the pharmacological evaluation of the central nervous system depressant compounds of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan P. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce decreased motor activity at 40 mg./kg. There were no deaths in the test animals at the highest dose used, 400 mg./kg., intraperitoneally.

When the compounds of this invention are employed as central nervous system depressants they may be administered to warm-blooded animals, e.g., mice, rats, rabbits, dogs, cats, monkeys, etc., alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of benzoylacetonitrile (15.0 g., 0.103 mole), N-methylpiperidone (11.5 g., 0.103 mole) and polyphosphoric acid (400 g.) is stirred at 100° C. for forty-five minutes. Thereafter, additional N-methylpiperidone (11.5 g., 0.103 mole) is added and the temperature is increased to 155° C. for one and a half hours. The dark reaction mixture is poured with vigorous stirring into cold water (1500 ml.) and the resultant red solution is treated with charcoal, filtered, and the filtrate basified with 45% potassium hydroxide (pH 8). An oil separates which slowly crystallizes. The precipitate is collected by filtration, washed with water, air-dried; to yield 5,6,7,8-tetrahydro-6-methyl-4-phenyl-1,6 - naphthyridin-2-ol (18 g., 73%) M.P. 243–6° C. decomp. (uncorr.) which is recrystallized from n-propanol to afford a white solid, M.P. 246–8° C. decomp.

Analysis.—Calc'd for $C_{15}H_{16}N_2O$ (percent): C, 74.96; H, 6.71; N, 11.65. Found (percent): C, 75.07; H, 6.57; N, 11.54.

The above prepared 5,6,7,8 - tetrahydro-6-methyl - 4-phenyl-1,6-naphthyridin-2-ol (4.0 g., 0.0167 mole) is slowly added with cooling and stirring to a solution of 3,4,5-trimethoxybenzyol chloride (3.86 g., 0.0167 mole), anhydrous pyridine (2.70 ml., 0.0334 mole) and anhydrous benzene (60 ml.). The slurry is refluxed for six hours and the solvent is then evaporated. The residue is dissolved in methylene chloride and extracted with a 20% sodium carbonate solution. After being dried over hydrous sodium sulfate, the methylene chloride solution is evaporated giving a solid, 6.3 g. (87%) which is recrystallized from methylcyclohexane to afford 5,6,7,8-tetrahydro-6-methyl-4-phenyl - 1,6 - naphthyridin - 2-ol, [3,4,5-trimethoxybenzoate] as a crystalline solid, M.P. 127–8° C.

Analysis.—Calc'd for $C_{25}H_{26}N_2O_5$ (percent): C, 69.10; H, 6.17; N, 6.45. Found (percent): C, 69.34; H, 6.12; N, 6.40.

In a similar manner, p-toluylacetonitrile is reacted with N-ethylpiperidone to produce 6-ethyl-5,6,7,8-tetrahydro-4-(p-tolyl)-1,6-naphthyridin-2-ol which is then reacted with acetyl chloride to afford 6-ethyl-5,6,7,8-tetrahydro-4-(p-tolyl)-1,6-naphthyridin-2-ol, acetate.

EXAMPLE II

Repeating the procedure of Example I, α-acetyl phenylacetonitrile (15.0 g., 0.0941 mole) is reacted with N-methylpiperidone (21.4 g., 0.188 mole) in polyphosphoric acid (400 g.) to yield 5,6,7,8-tetrahydro-4,6-dimethyl-3-phenyl-1,6-naphthyridin-2-ol, M.P. 253–5° C.

Analysis.—Calc'd for $C_{16}H_{18}N_2O$ (percent): C, 75.56; H, 7.14; N, 11.02. Found (percent): C, 75.60; H, 7.01; N, 11.05.

The above prepared 5,6,7,8-tetrahydro-4,6-dimethyl-1,6-naphthyridin-2-ol (0.0167 mole) is slowly added with cooling and stirring to a solution of p-methoxybenzoyl chloride (0.0167 mole), anhydrous pyridine (0.0334 mole) and anhydrous dioxane (60 ml.). The slurry is refluxed for ten hours and the solvent is then evaporated. The residue is dissolved in methylene chloride and extracted with a 25% potassium carbonate solution. After being dried over anhydrous sodium sulfate, the methylene chloride solution is evaporated leaving a residue which is recrystallized from cyclohexane to afford 5,6,7,8-tetrahydro-4-6-dimethyl-1,6-naphthyridin-2 - ol,[4 - methoxybenzoate].

EXAMPLE III 5,6,7,8- tetrahydro-6-methyl-4-phenyl-1,6-naphthyridin-2-ol (5.0 g., 0.028 mole) as prepared in Example I is slowly added with cooling and stirring to a solution of benzoyl chloride (2.42 ml., 0.0208 mole), anhydrous pyridine (3.0 ml.) and anhydrous benzene (60 ml.). The slurry is refluxed for six hours and the solvent is then evaporated. The residue is dissolved in methylene chloride and extracted with a 20% sodium carbonate solution. After being dried over anhydrous sodium sulfate, the methylene chloride solution is evaporated leaving a solid residue which is recrystallized from diethyl ether to afford 5,6,7,8 - tetrahydro-6-methyl-4-phenyl-1,6-naphthyridin-2-ol, benzoate, M.P. 120–1° C.

Analysis.—Calc'd for $C_{22}H_{20}N_2O_2$ (percent): C, 76.72; H, 5.85; N, 8.13. Found (percent): C, 77.08; H, 6:12; N, 843.

EXAMPLE IV

A mixture of p-chlorobenzoylacetonitrile (0.20 mole), N-benzylpiperidone (0.20 mole) and polyphosphoric acid (800 g.) is stirred at about 100° C. for one hour. Thereafter, additional N-benzylpiperidone (0.20 mole) is added and the temperature is increased to about 150° C. for two hours. The reaction mixture is then poured with vigorous stirring into cold water (3,000 ml.) and the resultant solution is treated with charcoal, filtered, and the filtrate basified with sodium hydroxide (pH 8). The separated product is collected by filtration, washed with water, air-dried; and recrystallized from ethanol to yield 6 - benzyl - 4 - (p-chlorophenyl) - 5,6,7,8-tetrahydro-1,6-naphthyridin-2-ol.

The above prepared 5,6,7,8-tetrahydro-1,6-naphthyridin-2-ol (0.015 mole) is slowly added with cooling and stirring to a solution of 3,4,5-triethoxybenzoyl chloride (0.015 mole), anhydrous pyridine (3.0 ml.) and anhydrous benzene (60 ml.). The slurry is heated to 70° C. for ten hours and the solvent is then evaporated. The residue is dissolved in methylene chloride and extracted with a 20% sodium carbonate solution. After being dried over anhydrous sodium sulfate, the methylene chloride solution is evaporated giving a solid, which is recrystallized from methylcyclohexane to afford 6-benzyl-4-(p-chlorophenyl)-5,6,7,8-tetrahydro-1,6-naphthyridin - 2 - ol,[3,4,5-triethoxybenzoate].

polyphosphoric acid (400 g.) is stirred at 100° C. for one hour. Thereafter, additional N-(2-dimethylaminoethyl) piperidone (0.103 mole) is added and the temperature is increased to 150° C. for two hours. Thereafter, the reaction mixture is poured with vigorous stirring into cold water (1500 ml.) and the resultant solution is treated with charcoal, filtered, and the filtrate basified with 50% sodium hydroxide (pH 8). The resulting precipitate is collected by filtration, washed with water, air-dried; and recrystallized from ethanol to yield 5,6,7,8-tetrahydro-6-(2-dimethylaminoethyl)- 4 -methyl-3-phenylnaphthyridin-2-ol.

The above prepared 5,6,7,8-tetrahydro-6-(2-dimethylaminoethyl)-4-methyl-3-phenylnaphthyridin- 2 -ol (0.015 mole) is slowly added with cooling and stirring to a solution of benzoyl chloride (0.015 mole), anhydrous pyridine (0.03 mole) and anhydrous benzene (60 ml.). The slurry is refluxed for fifteen hours and the solvent is then evaporated. The residue is dissolved in methylene chloride and extracted with a 20% sodium carbonate solution. After being dried over anhydrous sodium sulfate, the methylene chloride solution is evaporated to afford a residue which is recrystallied from methylcyclohexane to afford 5,6,7,8 - tetrahydro - 6-(2-dimethylaminoethyl)-4-methyl-3-phenyl-1,6-naphthyridin-2-ol, benzoate.

EXAMPLE VI

Repeating the procedure of the prior examples, an appropriate acetonitrile is reacted with a piperidone to obtain a 5,6,7,8-tetrohydro-1,6-naphthyridin-2-ol which is then reacted with an acyl halide to afford a compound of the following structural formula:

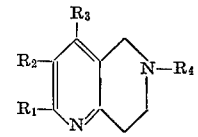

wherein $R_1$, $R_2$, $R_3$ and $R_4$ are defined:

| $R_1$ | $R_2$ | $R_3$ | $R_4$ |
|---|---|---|---|
| Acetoxy | Butyl | Phenethyl | Carbethoxy. |
| p-Iodobenzoxy | Methoxy | p-Chlorobenzyl | Benzoyl. |
| Ethylcarbamyloxy | p-Tolyl | Furyl | Hydrogen. |
| p-Fluorobenzoxy | Hydrogen | Pyridazyl | Methylcarbamyl. |
| Butyroxy | Benzoyl | Ethyl | Carbomethoxy. |
| m-Ethylbenzoxy | p-Chlorophenethyl | Methoxy | Methylsulfonyl. |
| Methylcarbamyloxy | p-Chlorphenyl | Thienyl | Butyl. |
| Acetoxy | Pyrimidyl | Hydrogen | p-Chlorophenyl. |
| p-Butoxybenzoxy | Benzyl | p-Methoxyphenyl | p-Tolyl. |
| Benzoxy | p-Methoxyphenyl | Benzoyl | 3-phenpropyl. |
| p-Butylbenzoxy | Furyl | Hydrogen | 3-diethylaminopropyl. |
| Propionoxy | p-Chlorobenzyl | Pyrimidyl | p-Ethylphenyl. |
| Benzoxy | Ethoxy | p-Ethoxyphenyl | Ethylsulfonyl. |
| Butylcarbamyloxy | p-Methybenzyl | Butoxy | Carbopropoxy. |
| p-Chlorobenzoxy | p-Boromophenyl | Pyridyl | Phenethyl. |
| Benzoxy | p-Ethoxybenzyl | p-Methylbenzyl | p-Bromophenyl. |
| Acetoxy | Thienyl | Ethoxy | Dimethylaminopropionyl. |
| m-Bromobenzoxy | 4-phenbutyl | Hydrogen | Diethylaminovaleryl. |
| Benzoxy | Methyl | p-Methoxybenzyl | Ethylcarbamyl. |

Similarly, employing appropriate starting compounds the following compounds are prepared:

4-(m-bromophenyl)-5,6,7,8-tetrahydro-6-phenyl-1,6-naphthyridin-2-ol, propionate;

5,6,7,8-tetrahydro-3,4,6-tripropyl-1,6-naphthyridin-2-ol,[4-bromobenzoate];

3-ethyl-5,6,7,8-tetrahydro-4-(p-propoxybenzyl)-6-(2-pyridyl)-1,6-naphthyridin-2-ol, acetate;

3-butoxy-5,6,7,8-tetrahydro-6-(m-methoxyphenyl)-1,6-naphthyridin-2-ol,[4-ethoxybenzoate];

4-butyl-5,6,7,8-tetrahydro-3-pyridyl-1,6-naphthyridin-2-ol, butyrate; and 4-benzyl-3-(p-trifluoromethylphenyl)-5,6,7,8-tetrahydro-1,6-naphthyridin-2-ol,[4-toluate].

EXAMPLE V

A mixture of α-valeryl phenylacetonitrile (0.103 mole), N-(2-dimethylaminoethyl)piperidone (0.206 mole) and

EXAMPLE VII

A mixture of p-iodobenzoylacetonitrile (0.10 mole), N-ethylpiperidone (0.10 mole) and polyphosphoric acid (400 g.) is stirred at steam bath temperatures for one hour. Thereafter, additional N-ethylpiperidone (0.10 mole) is added and the temperature is increased to 150° C. for two hours. The reaction mixture is then poured with vigorous stirring into cold water (1500 ml.) and the resultant solution is treated with charcoal, filtered and the filtrate basified with sodium hydroxide to a pH of about 8. The resulting precipitate is collected by filtration, washed with water, air-dried; and recrystallized from n-propanol to yield 6-ethyl-5,6,7,8-tetrahydro-4-(p-iodophenyl)-1,6-naphthyridin-2-ol.

The above prepared 6-ethyl-5,6,7,8-tetrahydro-4-(p-iodophenyl)-1,6-naphthyridin-2-ol (0.03 mole) is slowly added with cooling and stirring to a solution of propionyl bromide (0.03 mole), anhydrous pyridine (0.07 mole)

and anhydrous toluene (120 ml.). The slurry is refluxed for ten hours and the solvent is then evaporated. The residue is dissolved in methylene chloride and extracted with a sodium carbonate solution. After being dried over anhydrous sodium sulfate, the methylene chloride solution is evaporated to afford a residue which is recrystallized from methylcyclohexane to afford 6-ethyl-5,6,7,8-tetrahydro-4-(p-iodophenyl)-1,6-naphthyridin-2-ol, propionate.

Similarly, p-butoxybenzoyl acetonitrile is reacted with N - (p - ethoxyphenyl)piperidone to afford 4-(p-butoxyphenyl) - 6 - (p - ethoxyphenyl) - 5,6,7,8 - tetrahydro - 1,6-naphthyridin-2-ol which is then esterified by contact with benzoyl chloride to afford the corresponding benzoate ester.

EXAMPLE VIII

When the procedure of the prior examples is repeated to react an appropriate acetonitrile with a piperidone, there is obtained a 5,6,7,8-tetrahydro-1,6-naphthyridin-2-ol which is then esterified to yield the following compounds.

4-[2-(p-bromophenyl)ethyl]-5,6,7,8-tetrahydro-3-propoxy-6-(m-propylphenyl)-1,6-naphthyridin-2-ol, propionate;
3-(p-ethylphenyl-4-(p-trifluoromethylphenyl)-5,6,7,8-tetrahydro-6-(p-iodophenyl)-1,6-naphthyridin-2-ol-benzoate;
3-[3-(m-ethoxyphenyl)propyl]-5,6,7,8-tetrahydro-6-(p-propoxyphenyl)-1,6-naphthyridin-2-ol, [3,4,5-trimethoxybenzoate];
4-(p-ethylphenyl)-5,6,7,8-tetrahydro-3-pyridazyl-1,6-naphthyridin-2-ol, [p-chlorobenzoate];
3-(p-fluorophenyl)-5,6,7,8-tetrahydro-4-(p-iodobenzyl)-6-(p-propoxyphenyl)-1,6-naphthyridin-2-ol, acetate;
4-[3-(o-ethoxyphenyl)propyl]-5,6,7,8-tetrahydro-6-methyl-1,6-naphthyridin-2-ol, butyrate;
6-butyl-5,6,7,8-tetrahydro-3-(m-iodophenyl)-4-(p-propylphenyl)-1,6-naphthyridin-2-ol, benzoate;
4-(p-butoxyphenyl)-3-[2-(p-ethoxyphenyl)ethyl]-5,6,7,8-tetrahydro-1,6-naphthyridin-2-ol, [4-chlorobenzoate];
5,6,7,8-tetrahydro-3-(p-propoxybenzyl)-1,6-naphthyridin-2-ol, propionate;
4-[3-(p-fluorophenyl)propyl]-5,6,7,8-tetrahydro-3-(2-phenethyl)-1,6-naphthyridin-2-ol, acetate;
5,6,7,8-tetrahydro-4(4-phenbutyl)-3-(p-propylphenyl)-1,6-naphthyridin-2-ol, benzoate;
4-(p-butylbenzyl)-5,6,7,8-tetrahydro-3-(p-iodobenzyl)-6-methyl-1,6-naphthyridin-2-ol, butyrate;
4-[3-(p-ethoxyphenyl)propyl]-5,6,7,8-tetrahydro-6-propyl-1,6-naphthyridin-2-ol, benzoate; and
5,6,7,8-tetrahydro-4,6-dimethyl-3-(p-propoxybenzyl)-1,6-naphthyridin-2-ol, acetate.

EXAMPLE IX

The hydrochloride salt of 5,6,7,8-tetrahydro - 6-methyl-4-phenyl - 1,6-naphthyridin - 2-ol,[3,4,5 - trimethoxybenzoate], as prepared in Example I, is obtained by admixing an ethanolic solution of the compound with a 1 N aqueous solution of hydrochloric acid and, thereafter, removing the co-solvents under vacuum.

Other acid addition salts of the compounds described in the above examples are prepared by similar procedures employing hydrobromic acid, hydroiodic acid, hydrochloric acid, nitric acid, sulfuric acid, phosphoric acid, citric acid, tartaric acid, acetic acid, succinic acid, maleic acid and gluconic acid.

EXAMPLE X

A solution of 5,6,7,8 - tetrahydro-6 - methyl-4 - phenyl-1,6-naphthyridin-2-ol (5.45 g., 0.0227 mole) and phenylphosphine dichloride (50 ml.) is stirred under nitrogen and heated at 180° C. for four hours. The dark solution is slowly added to water (180 ml.) with vigorous stirring. The resultant solution is treated with charcoal, filtered and the filtrate basified with ammonium hydroxide. The solid which precipitates is collected by filtration, washed with water, and air-dryed; the yield of the 2-chloro - 5,6,7,8-tetrahydro - 6-methyl - 4-phenyl - 1,6-naphthyridine is 5.2 g. (88%) M.P. 92–3° C. Recrystallization from pentane affords a white crystalline solid, M.P. 94–5° C.

*Analysis.*—Calc'd for $C_{15}H_{15}ClN_2$ (percent): C, 69.61; H, 5.84; N, 10.83; Cl, 13.70. Found (percent): C, 69.93; H, 5.96; N, 10.57; Cl, 14.04.

EXAMPLE XI

A solution of the above prepared 2-chloro-5,6,7,8-tetrahydro - 6-methyl - 4-phenyl-1,6 - naphthyridine (3.9 g., 0.015 mole), sodium hydroxide (0.6 g., 0.015 mole), 10% palladium on charcoal (0.5 g.) and absolute ethanol (60 ml.) is hydrogenated at room temperature and an initial pressure of 40 lbs. for five hours. The solution is filtered and the solvent distilled in vacuo. The residue is taken-up in methylene chloride, washed, dried and evaporated. The residual oil solidifies; the yield of 5,6,7,8-tetrahydro-6 - methyl-4 - phenyl-1,6 - naphthyridine is 2,9 g. (87%3, M.P. 74–5° C. Recrystallization from pentane affords a white crystalline solid, M.P. 77–8° C.

*Analysis.*—Calc'd. for $C_{15}H_{16}N_2$ (percent): C, 80.31; H, 7.19; N, 12.49. Found (percent): C, 80.31; H, 6.96; N, 12.52.

What is claimed is:

1. A compound selected from the group consisting of those having the formula:

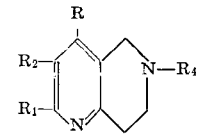

wherein $R_1$ is selected from the group consisting of lower alkanoyloxy, benzoyloxy, halobenzoyloxy, lower alkylbenzoyloxy, lower alkoxybenzoyloxy and tri(lower)alkoxybenzoyloxy; $R_2$ and $R_3$ are both selected from the group consisting of hydrogen, lower alkyl, lower alkoxy, phenyl, halophenyl, lower alkylphenyl, trifluoromethylphenyl, lower alkoxyphenyl, phen(lower)alkyl, halophen(lower)alkyl, lower alkylphen(lower)alkyl, lower alkoxyphen(lower)alkyl, with the proviso that only one of $R_2$ and $R_3$ can be hydrogen; $R_4$ is selected from the group consisting of hydrogen, lower alkyl, benzyl, phenyl, halophenyl, lower alkylphenyl, lower alkoxyphenyl, di(lower)alkylamino(lower)alkyl; and the pharmacologically acceptable acid addition salts thereof.

2. A compound as described in claim 1 which is: 5,6,7,8-tetrahydro - 6-methyl-4 - phenyl - 1,6-naphthyridin-2-ol,[3,4,5-trimethoxybenzoate].

3. A compound as described in claim 1 which is: 5,6,7,8 - tetrahydro-6 - methyl-4 - phenyl-1,6 - naphthyridin-2-ol, benzoate.

4. A compound as described in claim 1 which is: 6-ethyl - 5,6,7,8 - tetrahydro-4 - (p-tolyl)-1,6-naphthyridin-2-ol, acetate.

5. A compound as described in claim 1 which is: 5,6,7,8 - tetrahydro-4.6 - dimethyl-1,6 - naphthyridin - 2-ol, [4-methoxybenzoate].

6. A compound as described in claim 1 which is: 6-benzyl - 4-(p-chlorophenyl) - 5,6,7,8 - tetrahydro - 1,6-naphthyridin-2-ol,[3,4,5-triethoxybenzoate].

7. A compound as described in claim 1 which is: 4-(m-bromophenyl) - 5,6,7,8 - tetrahydro - 6-phenyl - 1,6-naphthyridin-2-ol, propionate.

8. A compound as described in claim 1 which is: 5,6,7,8 - tetrahydro - 3,4,6 - tripropyl - 1,6-naphthyridin-2-ol, [4-bromobenzoate].

9. A compound as described in claim 1 which is: 4 benzyl-3 - (p-trifluoromethylphenyl) - 5,6,7,8 - tetrahydro-1,6-naphthyridin-2-ol, [toluate].

10. A compound as described in claim 1 which is: 5,6,7,8 - tetrahydro-6 - (2-dimethylaminoethyl) - 4-methyl-3-phenyl-1,6-naphthyridin-2-ol, benzoate.

References Cited

UNITED STATES PATENTS 3,225,055   12/1965   Lesher _____ 260—295.5

ALAN L. ROTMAN, Primary Examiner

U.S. Cl. X.R.

260—250, 256.4, 294.8, 296, 999